Patented Oct. 15, 1935

2,017,090

UNITED STATES PATENT OFFICE 2,017,090

FERTILIZER AND METHOD OF FERTILIZING

William Eggert, Jr., Brooklyn, N. Y.

No Drawing. Application May 5, 1934,
Serial No. 724,208

4 Claims. (Cl. 71—9)

My improvement in fertilizers involves obtaining potash and phosphoric acid, for use as fertilizers, from low cost raw materials known to contain those essentials.

The object of my improvement is to make it possible for the planter or grower of small crops, as well as the planter or grower on an extensive scale, to avail himself of the plant-nourishing elements or materials to be found in certain abundant raw materials, without the employment of costly chemical treatment or expensive apparatus, and even without the employment of additional labor where such is neither convenient nor practical. The improvement is intended to benefit the small farmer who, if he chooses, may prepare the special fertilizers referred to herein without assistance.

My improved fertilizer, in suitable form for application to the land to be enriched, comprises suitable organic substances such as cottonseed meal, linseed meal, castor pomace, or the like, and certain sources of potash and phosphoric acids respectively in the form of finely ground mineral substances such as feldspar for the potash and phosphate rock for the phosphoric acids, or other materials known to yield potash or phosphoric acids under the decomposing action of constituents of the organic matter. According to my method of fertilizing, the above ingredients are incorporated in the soil, as by mixing or harrowing in, and decomposition of the organic matter and said other materials while in the soil renders the fertilizing element contained therein soluble and suitable for plant nourishment. For generally favorable results, the substances to be used in this method of fertilizing should be applied to the soil not less than one week before planting and then harrowed under, permitting the corrosive energy of fermentation of the organic materials to subside.

A tested and approved mixture of fertilizing ingredients particularly suitable for growing tobacco crops from which a free-burning tobacco is desired, would be: cottonseed meal, feldspar and phosphate rock, preferably in equal proportions, finely ground and mixed (or applied separately when ground) and applied at the rate of about one and a half tons to the acre after plowing, and then harrowed in not less than one week before planting.

The application of this fertilizer to the land will impart to the leaves of tobacco plants grown thereon those properties which when the leaf is made into cigars will produce in burning the long-lost firmly adhering solid ash of light pigeon-blue color; an ash not inclined to fall away, but with ordinary care adhering firmly to the burning cigar to the extent of from one to two inches, and permitting regular disposal of the ashes without the annoyance of frequently falling ash and the danger of shedding burning particles on cotton fabrics, light garments and the skin of the smoker.

The means herein described are consistent with the method employed by nature during past ages, in which natural forces enriched the tobacco-growing sections of Connecticut with deposits of finely ground feldspar—the result of the grinding of boulders in rushing floods in which back-flowing side currents carried in suspension the finest particles to be deposited at the point where the back flow ceased. Water-logged vegetation, presently decaying, furnished the nitric and phosphoric acid to act upon and convert the feldspar and to prepare the soil of that region for the production of the cigar material sought by the majority of critical smokers who could afford but did not prefer the imported Havana cigar. My method, as herein set forth, is a reproduction, as nearly as may be, of that above described, and its application results in the growth of the finest quality of cigar tobacco.

While I have designated the above described fertilizer more particularly for growing tobacco crops, where exceptionally large proportions of potash are required to secure free burning qualities in the product; my fertilizer mixture is equally applicable to the enrichment and nourishment of soils intended for other crops, where quality and finest flavor rather than quantity are sought by the grower.

What I claim is:

1. A fertilizer comprising feldspar as a source of potash and phosphate rock as a source of phosphoric acid, both of said minerals being finely ground, and an organic nitrogenous substance including the meal of oil bearing seeds in proportions whereby when said ingredients are incorporated in the soil the potash and phosphoric acid contents of the minerals are acted upon by constituents of said organic substance to render said potash and phosphoric acid available to plant life.

2. A fertilizer according to claim 1 and wherein the organic nitrogenous substance includes the meal of one of the group consisting of cottonseed, castor beans and linseed.

3. A fertilizer according to claim 1 and wherein the several named ingredients occur in substantially equal proportions.

4. Method of soil fertilization which includes applying thereto and mixing therewith in situ finely ground feldspar and finely ground phosphate rock together with a seed meal of the group consisting of cottonseed, castor beans and linseed, said feldspar, phosphate rock and seed meal being in substantially equal proportions.

WILLIAM EGGERT, JR.